3,422,046
COATING CONTAINING A CONDENSATE OF A PHOSPHATE ETHER POLYOL AND A MELAMINE, AN ALKYLATED AMINE, AND A HALOGENATED HYDROCARBON
Francis H. Thomas, Flossmoor, Hugh M. Headrick, Homewood, and Edmund L. Schulz, Palos Heights, Ill., assignors to The Sherwin-Williams Company, Cleveland, Ohio, a corporation of Ohio
No Drawing. Filed Feb. 3, 1966, Ser. No. 524,839
U.S. Cl. 260—28
Int. Cl. C08g 51/50; C08g 51/52
14 Claims

ABSTRACT OF THE DISCLOSURE

Intumescent coatings containing a resinous condensation product of a phosphate ether polyol and a melamine compound, an alkylated amine, a halogenated hydrocarbon, and a solvent.

---

This invention relates to new and improved coating compositions and to a process for producing such compositions. The invention is especially useful in the preparation of moisture resistant, fast curing coating compositions that form intumescent, clear coatings on wood and other substrate.

Intumescence is a state of being swollen or inflated. A film or coating that will intumesce will enlarge or expand with heat. In other words, it will swell or bubble up and assume a cellular structure. Coatings of this type provide protection to the substrate against the rapid spread of flame.

Most organic films or coatings will burn to an ash. An intumescent coating, on the other hand, should leave a cellular residue on the substrate. The cellular residue should be a thermal insulator which protects the substrate against heat and thereby prolongs the period during which the substrate will not be ignited by a flame.

While intumescent coatings are not new as such, it has been difficult heretofore to develop a clear coating composition, that is, a composition which after being applied to a substrate, such as wood, allows the substrate to be seen through a clear or transparent coating.

In the preparation of a coating composition containing an intumescent resin, the mere property that the resin will intumesce is only one of the properties necessary for a satisfactory coating composition. Resins which will intumesce do not necessarily have the property of fast curing. Nor do they necessarily possess moisture resistance. In order to improve these characteristics in the coating composition, it is desirable to do so in such a way that the essential property of intumescence is not destroyed. Furthermore, in order for intumescence to take place properly, the intumescent resin, when exposed to high temperatures, should (1) melt or soften, (2) decompose with the liberation of gases, and (3) produce a charred residue which retains its rigidity, in that order. If this sequence is destroyed, the results are usually undesirable. Hence, when other substances are added to the coating composition for specific purposes, it is essential that the addition should not destroy the intumescent property of the intumescent resin.

One of the objects of the present invention is to provide new and improved coating compositions containing an intumescent resin and modifiers which will enhance the curing properties of the coating composition and improve moisture resistance without destroying the intumescent property.

Another object of the invention is to provide coating compositions of the type described which form clear coatings that can be cured in a relatively short period of time, retain their clarity, are resistant to moisture, are resistant to all normal household chemicals, have cold check resistance, are mar resistant, possess impact resistance, and also are rendered resistant to the spread of flame in the coating itself.

An additional object of the invention is to provide new and improved coating compositions for wooden panels and new and improved wooden panels coated with such compositions.

A further object of the invention is to provide a new and improved process for producing the aforesaid coating compositions. Other objects will appear hereinafter.

In accordance with the invention, a new and improved coating composition is provided comprising a water insoluble film forming intumescent resin, at least one volatilizable organic solvent for said resin, an alkylated amine modifier in sufficient quantity to improve the curing rate of the resultant composition, and a quantity of a normally solid, halogenated hydrocarbon soluble in said solvent, said quantity being sufficient to enhance the moisture resistance of a coating formed when said coating composition is applied to a substrate.

The quantity of the alkylated amine modifier should preferably be within the range of 5% to 40% by weight of the intumescent resin. The quantity of the halogenated hydrocarbon can vary from 2% to 15% by weight of the intumescent resin. The quantity of the volatilizable organic solvent should be sufficient to give a fluidity which will provide a coating from 2 to 6 mils thick (0.002 to 0.006″).

The alkylated amine modifier can be, for example, an alkylated melamine in which the alkyl groups containing 1 to 4 carbon atoms, preferably butylated or isobutylated melamine, or an alkylated urea-formaldehyde resin in which the alkyl groups contain 1 to 4 carbon atoms, preferably butylated or isobutylated dimethylol urea.

The halogenated hydrocarbon can be either a chlorinated hydrocarbon or a brominated hydrocarbon, preferably a chlorinated paraffin hydrocarbon or a brominated paraffin hydrocarbon. Especially good results have been obtained with a chlorinated paraffin wax containing about 70% chlorine.

The intumescent resin can be, for example, the water insoluble resinous condensation product of the reaction of a water soluble phosphate ether polyol and a water soluble melamine-formaldehyde or alkoxy methyl-melamine.

These resins can be prepared by reacting said water soluble phosphate ether polyol and said water soluble nitrogen compound in an organic solvent or solvents for the reactants at temperatures sufficiently high to remove or boil off from the reaction mixture the by-products of the reaction, e.g., water or an alcohol. In most cases, the temperature of the reaction should be at least 200° F. (93° C.). In general, satisfactory results are obtained by carrying out the reaction in a temperature range from 210° F. (98.9° C.) to 260° F. (115.5° C.).

The reaction is preferably carried out in the presence of an acidic condensation catalyst. Good results have been obtained by using para-toluene sulfonic acid. Since this is a solid, it is usually preferable to dissolve it in a solvent which is compatible with the resultant product or can be eliminated by heat during the reaction period. A suitable solvent is methanol but other compatible solvents can be used. Other acidic condensation catalysts can also be employed, such as, for example, phosphoric acid and hydrogen chloride. Acidic condensation catalysts containing metals, such as aluminum chloride, can be used to produce water insoluble resins from water soluble phosphate ether polyols and water soluble melamine-formaldehyde or alkoxy methyl-melamine. However, resins made with such catalysts do not intumesce as readily because the metal of the catalyst may interfere with intumescence. The reaction to form the intumescent resin preferably should be carried far enough so that 35% to 80% of the function groups have reacted.

The solvent medium is usually a mixture of solvent, preferably including commercial xylene. Other suitable solvents which can be used are toluene, methyl ethyl ketone, methyl isobutyl ketone, butyl alcohol, mineral spirits, ditertiary acetylenic glycol, butyl acetate, ethyl acetate, isopropyl acetate, and the acetate of ethylene glycol monoethylether. A suitable commercial xylene is "Xylene 5° C." which is a mixture containing 10% to 30% orthoxylene, up to 20% ethyl benzene and the remainder meta and para-xylene. The solvent medium should be capable of dissolving all of the aforementioned components of the coating composition.

The intumescent resins which are especially useful in forming coating compositions according to the invention are the water insoluble, xylene soluble products of the reaction of a water soluble phosphate ether polyol containing 4% to 15% by weight of phosphorus, having a hydroxyl number of 400–500, and a functionality of of 2–5, and water soluble melamine-formaldehyde or alkoxy methyl melamine containing 30% to 45% by weight melamine and 40% to 65% by weight formaldehyde, alkoxy groups, if present, constituting the remainder. The optimum resin composition range for varnish composition is 30% to 70% by weight phosphate ether polyol and 70% to 30% by weight melamine-formaldehyde or alkoxy methyl melamine. The intumescent resin should preferably contain 1.2% to 10.5% by weight phosphorus, 9% to 31.5% by weight melamine and 12% to 49% by weight formaldehyde, based on the resin weight.

Examples of suitable phosphate ether polyols for preparing the intumescent resin are those having the following structural formulate:

(1) 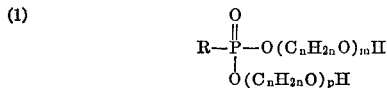

where R is aliphatic hydrocarbon (e.g., methyl, ethyl, propyl, isopropyl, butyl, isobutyl, amyl, isoamyl and higher homologues), $n$ is 2, 3 or 4, and $m$ and $p$ are at least 1, the total of $m$ and $p$ preferably being 2 to 12. The radical R can be phenyl, tolyl, cyclohexyl or the like, and can contain halogen substituents (e.g., chlorine and bromine), or hydroxyl substituents (e.g., hydroxy ethyl, hydroxy propyl, or hydroxy butyl). A typical commercial product in this class is di(polyoxypropylene)butyl phosphate (Fyrol 19) made by reacting butyl phosphate with 1,2-propylene oxide.

Phosphate ether polyols having the Formula 1 can be made by reacting an organic phosphorus acid of the formula (2) 

where R has the previous significance with the alkylene oxide such as ethylene oxide, 1,2-propylene oxide or 1,2-butylene oxide, or mixtures of these oxides, or any two or more of these oxides added sequentially. The addition of ethylene oxide produces adducts containing primary hydroxyl groups which are generally more reactive than secondary hydroxy groups derived from 1,2-propylene oxide. Ethylene oxide addition also increases water solubility. Thus, in order to provide terminal primary hydroxyl groups, 1,2-propylene oxide can be added to the organo phosphorus acid followed by ethylene oxide.

The O,O-dialkyl bis hydroxyalkyl)amino-methyl phosphonates can also be employed in the practice of the invention. These compounds have the chemical formula (3) 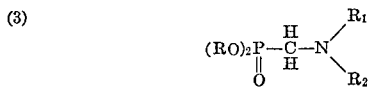

where R is alkyl (e.g., methyl, ethyl, propyl, isopropyl, butyl, and higher homologues) and $R_1$ and $R_2$ are hydroxyalkyl (e.g., 2-hydroxy ethyl, 2-hydroxy propyl, and homologues). A commercially available phosphate ether polyol of this type is O,O-diethyl N,N(2-hydroxy-ethyl) aminomethyl phosphate which has the Formula 3 wherein R is ethyl and $R_1$ and $R_2$ are hydroxyethyl.

The phosphate ether polyol can also be one which is derived by oxyalkylation of a polyphosphoric acid. Examples of such polyols are those having the formula (4) 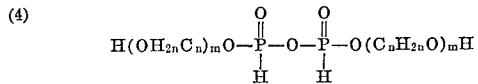

where $n$ is 2 to 4 and $m$ is 1 to 4. A specific compound of this type is made by oxyalkylating the polyphosphoric acid with 4 to 8 moles of 1,2-propylene oxide per mole of acid (Vircol 82).

Other suitable phosphate ether polyols are those derived by oxyalkylating pyrophosphoric acid with ethylene oxide and/or 1,2-propylene or other alkylene oxides. These phosphate ether polyols have the general formula (5) 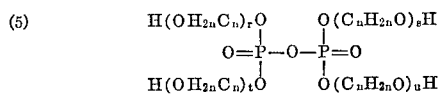

where $n$ is 2 to 4 and $r$, $s$, $t$ and $u$ are one or more depending upon the number of moles of alkylene oxide used in making the adduct. Thus, in a four mole adduct made by reacting four moles of 1,2-propylene oxide with one mole of pyrophosphoric acid the formula would be the following (6) 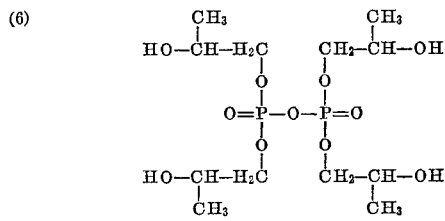

Commercial products containing ether polyols of Formula 6 apparently blended with propylene oxide adducts of pentaerythritol of proper molecular weight to give products containing about 5.5% phosphorus by weight and which are suitable for the practice of the invention are Polyol 204–S, Polyol 216–S and Polyol 227–S.

Melamine-formaldehyde and alkoxylated melamine-formaldehyde cross link with the phosphate ether polyols to form the intumescent resins. Melamine has six reactive hydrogens and therefore can be reacted with one to six moles of formaldehyde to produce a methylol melamine having one to six methylol groups. This product is usually made by condensation at an alkaline pH. Thus, six moles of formaldehyde reacts with one mole of melamine to produce hexamethylolmelamine having the formula (7) 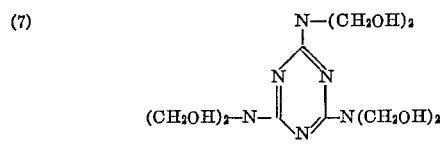

To produce an alkoxy melamine formaldehyde, methylol melamine is reacted with a monohydric alcohol (e.g., methanol, ethanol, propanol, butanol, isobutanol, and higher homologues) at an acid pH. Thus, hexamethylolmelamine reacts with methanol at an acid pH in proportions of one mole per six moles of methanol to form hexamethoxymethyl melamine having the formula (8)
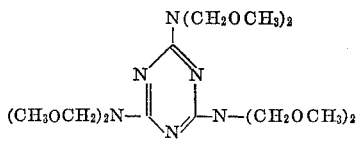

As a practical matter it is preferable to use an alkoxy methyl melamine as one of the reactants and preferably one which is fully alkoxylated. The possibility for side reactions is less and better control can be maintained in carrying out the desired reaction.

In the final products one or more phosphorus atoms are linked through a radical —O$(C_nH_{2n}O)_m$—CH$_2$— to one or more nitrogen atoms, where $n$ is 2 to 4 and $m$ represents the number of times the said radical occurs. Where only one mole of methanol has been eliminated in a reaction between hexamethoxymethyl melamine and a phosphate ether polyol of Formula 1 the product would have the formula (9)
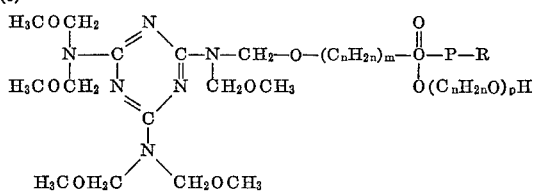

Since the melamine derivative has a functionality of 6 and the phosphate ether polyol has a functionality of at least 2, the final products can be assumed to be mixtures of melamine methylol- or alkoxy methylphosphate ether polyol condensation products. The average molecular weight of these products is believed to be in excess of 5000 and usually in the range of 10,000 to 15,000. Due to additional polymerization during curing, a coating of such products polymerizes to higher molecular weights. Excess melamine derivative will polymerize with itself.

In preparing resins of the type described, it has been noted that the water resistance of coatings made from coating compositions containing such resins increases with an increase in the relative proportion of melamine-formaldehyde or alkoxy methyl-melamine while the degree of intumescence decreases as the ratio of the melamine-formaldehyde or alkoxy methyl-melamine to the phosphate ether polyol increases. The optimum results for the purpose of preparing coating compositions that form clear, water resistant intumescent coatings are obtained by using a molar ratio of the melamine-formaldehyde or alkoxy methyl-melamine to the phosphate ether polyol exceeding 1:1 This ratio, however, preferably should not exceed a molar ratio of 1.6:1.

The invention will be further illustrated but is not limited by the following examples in which the quantities are given by weight unless otherwise indicated.

EXAMPLE I

In an apparatus equipped with means for removing a distillate, 900 parts of phosphate ether polyol (Polyol 204-S) was heated to 250° F.

1200 parts of hexamethoxymethyl melamine was mixed with 796 parts of xylene, 42 parts of p-toluene sulfonic acid and 42 parts of methanol. Another mixture was prepared from 415 parts of methyl isobutyl ketone and 100 parts of mineral spirits. 173 parts of the mixture containing the hexamethoxymethyl melamine was added to the phosphate ether polyol at 250° F. in ½ hour and the distillate was collected for 15 minutes thereafter, while the heat was allowed to drop to 210° F. The remainder of the mixture was then added in 1 hour. Thereafter, the mixture of methylisobutyl ketone and mineral spirits was added and the resultant mixture was held at 210° F. to U viscosity (Gardner-Holdt). Then 160 parts of chlorinated paraffin containing 70% chlorine was added. The mixture was cooled to 140° F. and 17 parts of methanol and 17 parts of ditertiary acetylenic glycol were added. The latter is added to improve the flow and appearance of the dry coating. It does not add or take away from the intumescence. The resultant material had a G+ viscosity and a specific gravity of 1.059.

To 560 parts of this material was added 65 parts of isobutylated melamine as a 50% by weight solution in a mixture of 60% by weight xylene and 40% by weight butyl alcohol.

This product has excellent varnish properties and when applied to a wooden wall panel and cured at temperatures of 120° F. and above, gives excellent coatings which have very good intumescence. The thickness of the coating can be varied but is preferably a minimum of 3.5 mils (0.0035″). At 225° F. a wet coating 4 mils thick will cure to a hard coating in two minutes.

The resultant coating is water white in color and is color retentive.

In tests that were made on these coatings the hot portion of a Bunsen burner flame did not penetrate beyond the first ply of the wood in 5 minutes. The coatings were moisture resistant. The cured coatings passed the ASTM D 1211–60 cold check cycle test.

These coatings had exceptional mar resistance and were not dulled when rubbed with glass wool. They also have excellent impact resistance. The gloss was excellent, being 98–100 at 60° on a photovolt gloss meter. The chemical resistance to all normal household chemicals was also excellent.

The thickness of the coating can be varied and two or more coatings can be applied.

EXAMPLE II

The procedure was the same as Example I except that butylated melamine was substituted for the isobutylated melamine.

EXAMPLE III

The procedure was the same as Example I except that isobutylated urea formaldehyde resin (Resimene 933) was substituted for the isobutylated melamine.

In a similar manner other alkylated amine resins and normally solid halogenated hydrocarbons can be combined with the same or other phosphate ether polyol resins of the type described to give new and improved intumescent, fast drying, water resistant coating compositions and wooden wall panels coated therewith. While it is preferred to use a chlorinated paraffin containing about 70% by weight chlorine (e.g., Chlorowax 70), a normally solid hydrocarbon containing a lower chlorine content can be used, for example, one containing 25–50% chlorine. Similarly, a brominated or mixed chloro-bromo normally solid hydrocarbon can be used. These normally solid hydrocarbons improve moisture resistance without destroying the intumescent property of the phosphate ether polyol resin. When an attempt was made to improve water resistance with a vinyl resin (VAGH) or with a linseed oil modified alkyd resin, the intumescent property was destroyed. The chlorine and/or bromine in the halogenated hydrocarbon have the added advantage of acting as fire retardants.

The alkylated amine enhances the drying or curing properties without affecting the intumescent property. Attempts to use conventional driers such as cobalt naphthenate resulted in poor intumescence.

The term "urea-formaldehyde" as used herein is intended to cover monomers such as dimethylol urea and fusible, or early stage, urea-formaldehyde polymers.

The proportion of solvent in the varnish compositions is subject to variation but is preferably within the range of 40% to 60% by weight. When the amount of solvent is under 30%, the composition becomes too viscous for conventional application and when it is over 60% it becomes too thin so that many coatings would be required in order to produce a final coating of the desired thickness. The solvents used, such as xylene and the other solvents mentioned, all have a vapor pressure at ambient temperatures such that they will evaporate readily.

Compositions of the type herein described can be used in many coating applications. They can also be cast into films or sheets and they are useful for other purposes. The invention is especially important, however, in providing compositions which can be applied as clear coatings that are intumescent and have most, if not all, of the other desirable properties of a satisfactory coating. Wooden panels which have been given a clear finish with coatings of these resins will cure at reasonable temperatures within the range of 140–225° F. and for reasonable periods. The resultant intumescent coatings on a wall panel will slow the spread of flame and thus make it possible to allow evacuation of a building and save the lives within the building in case of fire.

The invention is hereby claimed as follows:

1. A coating composition consisting essentially of an intumescent water insoluble resinous condensation product of 30% to 70% by weight phosphate ether polyol and 70% to 30% by weight of a melamine compound from the group consisting of a water soluble melamine-formaldehyde and a water soluble alkoxy methyl melamine, dissolved in a solvent which will evaporate when a coating of said composition is applied to an object, said water soluble phosphate ether polyol having at least one hydroxyalkyl radical containing two to four carbon atoms in the alkyl group, with the further proviso that said water soluble phosphate ether polyol contains 4% to 15% by weight phosphorus, has a hydroxyl number of 400–500 and a functionality of 2 to 5, said composition also containing 5% to 40% by weight of said intumescent resinous condensation product of an alkylated amine modifier from the class consisting of alkylated melamine and alkylated urea-formaldehyde in which the alkyl groups contain 1 to 4 carbon atoms, said amount of said alkylated amine modifier being sufficient to increase the curing rate of a dried coating of said composition without destroying the intumescent property of said coating, and 2% to 15% by weight of said intumescent resinous condensation product of a normally solid halogenated paraffin hydrocarbon in which the halogen atoms are from the class consisting of chlorine, bromine and mixtures thereof, said halogenated paraffin hydrocarbon containing 25% to 70% by weight of said halogen atoms and being effective to improve water resistance without destroying the intumescent property.

2. A coating composition as claimed in claim 1 which comprises an acid curing catalyst.

3. A coating composition as claimed in claim 2 in which said acid curing catalyst is p-toluene sulfonic acid.

4. A coating composition as claimed in claim 2 in which said acid curing catalyst is hydrogen chloride.

5. A coating composition as claimed in claim 1 in which said intumescent resin is a water insoluble resinous condensation product of the reaction of 30–70% by weight of a water soluble phosphate ether polyol containing 4–15% by weight phosphorus, having a hydroxyl number of 400–500 and a functionality of 2 to 5, and 70–30% by weight of a compound from the group consisting of a water soluble melamine-formaldehyde and a water soluble alkoxy methyl melamine, said resinous condensation product containing 1.2% to 10.5% by weight phosphorus, 9% to 31.5% by weight melamine and 12% to 49% by weight formaldehyde, and said composition also containing an acidic curing catalyst.

6. A coating composition as claimed in claim 1 in which said intumescent resin is the product of the reaction of 30–70% by weight of a water soluble oxypropylated pyrophosphoric acid containing approximately 5.5% by weight phosphorus, having a hydroxyl number of approximately 450 and a functionality of 4, and 70–30% by weight of hexamethoxymethyl melamine condensed to the extent that 35–80% of the functional groups have reacted, and said composition also contains an acid curing catalyst.

7. A composition as claimed in claim 1 in which said halogenated hydrocarbon is a chlorinated paraffin wax.

8. A composition as claimed in claim 5 in which said halogenated hydrocarbon is a chlorinated paraffin wax.

9. A composition as claimed in claim 1 in which the alkyl groups in the alkylated amine modifier contain four carbon atoms.

10. A composition as claimed in claim 5 in which the alkyl groups in the alkylated amine modifier contain four carbon atoms.

11. An article coated with a cured coating of a coating composition as claimed in claim 1.

12. An article coated with a cured coating of a coating composition as claimed in claim 5.

13. A wooden panel coated with an intumescent cured coating composition as claimed in claim 1.

14. A wooden panel coated with an intumescent cured coating composition as claimed in claim 10.

References Cited

UNITED STATES PATENTS

| | | | |
|---|---|---|---|
| 2,461,538 | 2/1949 | Fischer | 260—28 |
| 2,462,803 | 2/1949 | Campbell et al. | 260—28 |
| 2,680,102 | 6/1954 | Becher | 260—28 |
| 2,733,229 | 1/1956 | Brace | 260—73 |
| 3,134,742 | 5/1964 | Wismer et al. | 260—2.5 |
| 3,294,710 | 12/1966 | Rosenberg et al. | 260—28 |

OTHER REFERENCES 612,385   1/1961   Canada.

MORRIS LIEBMAN, *Primary Examiner.*

B. A. AMERNICK, *Assistant Examiner.*

U. S. Cl. X.R.

260—67.6, 849, 33.6, 33.4, 31.2, 32.8, 31.4; 117—148, 161